Feb. 10, 1970  G. KREIDER  3,494,631
CLEANING EQUIPMENT CART
Filed Jan. 29, 1968  2 Sheets-Sheet 2

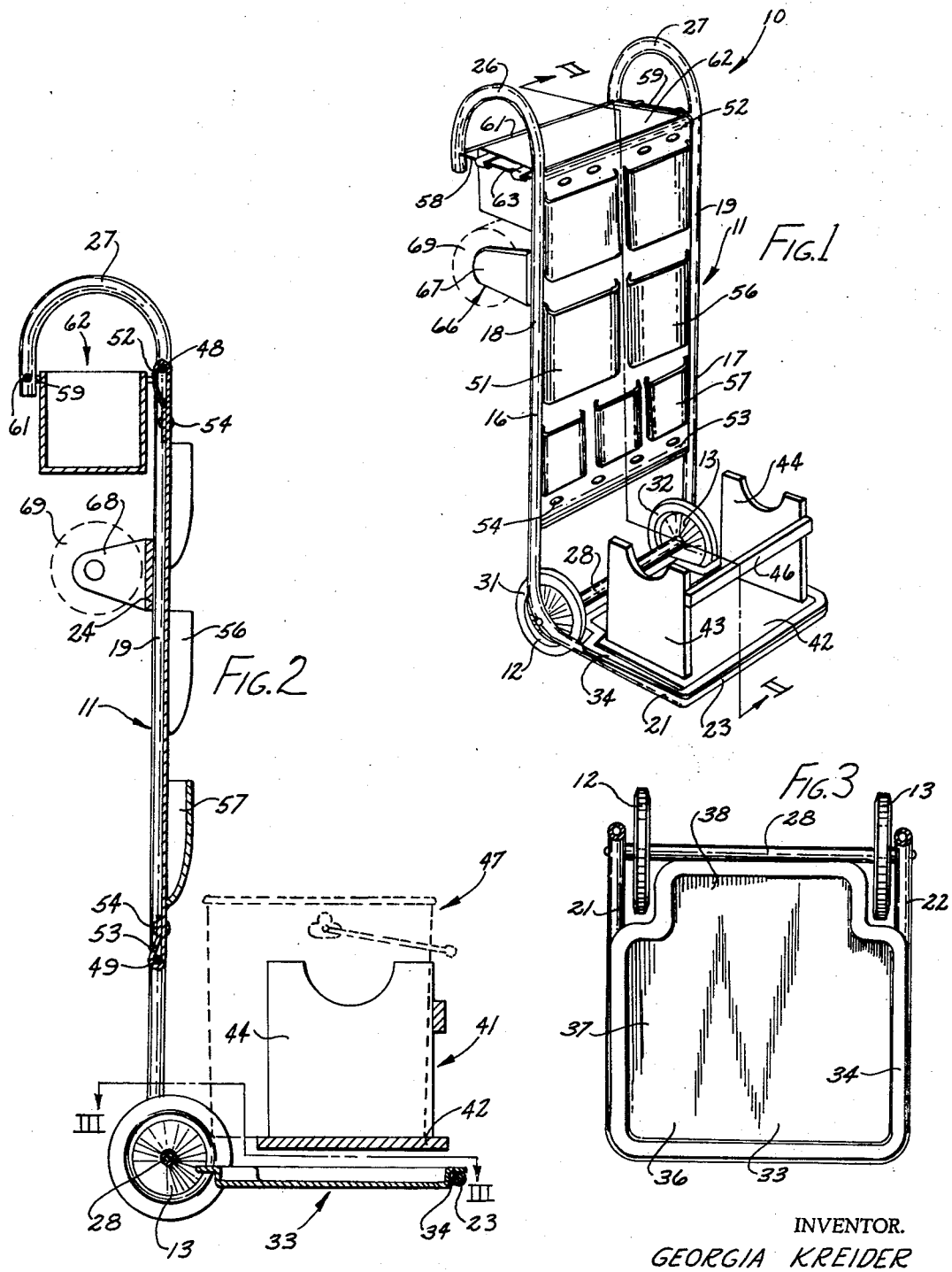

INVENTOR.
GEORGIA KREIDER
BY
Woodhams, Blanchard and Flynn
ATTORNEYS

United States Patent Office 3,494,631
Patented Feb. 10, 1970

3,494,631
CLEANING EQUIPMENT CART
Georgia Kreider, 608 Devonshire Drive,
Sturgis, Mich., 49091
Filed Jan. 29, 1968, Ser. No. 701,309
Int. Cl. B62b 1/02, 1/08
U.S. Cl. 280—47.19           6 Claims

ABSTRACT OF THE DISCLOSURE

A wheeled cart comprising spaced, L-shaped frame members providing a substantially horizontal platform adapted to support an inverted stool and substantially upright elements upon and between which equipment-supporting structure is held. The stool has structure which is adapted to cooperate with the lower part of the cart for supporting and positioning a container.

BACKGROUND OF THE INVENTION

This application relates in general to a wheeled cart for supporting cleaning equipment and, more particularly, to a two-wheeled cart having means adapted for carrying an inverted stool which serves to position and hold a container. The cart is arranged so that all of the equipment supported thereby is substantially completely disposed between two parallel planes defined by the main frame members of the cart so that the cart can be readily moved up and down stairs or between objects, such as furniture.

Persons acquainted with the problems of moving cleaning equipment from one place to another, especially in a home or small commercial building, have long been aware of the need for an appropriate vehicle for such equipment. Many improvements have been made in cleaning equipment and cleaning materials during the last 50 years. Nevertheless, most housewives still find it necessary to carry their various cleaning equipment and cleaning preparations from one room or from one floor to another in one or more baskets, cardboard cartons or the like. In almost all instances, such containers are makeshift at best and are not specifically designed to carry the various types or pieces of equipment presently in use. Accordingly, pieces of equipment often become buried in the bottom of the carrying device and containers of cleaning materials are frequently spilled or misplaced.

In order to avoid some of these problems, it is not uncommon for housewives and professional cleaning people to provide duplicate sets of cleaning materials, each set being left in one cleaning zone. This, of course, creates complications of maintaining a large inventory than necessary and some materials, which have a lower incidence of use, evaporate or become ineffective before the supply is exhausted.

In addition to the foregoing, the typical containers used to carry cleaning equipment and materials are unsightly, insubstanital, difficult to handle or carry and inconvenient to store. Moreover, they are not capable of carrying many of the items, such as stepstools, water buckets, mops and the like which are frequently an essential part of the cleaning operation.

Some of the modern cleaning equipment and materials are quite heavy and, accordingly, difficult for the average housewife to carry. As a result, housewives often purchase cleaning materials in smaller, but less economical, amounts in order to avoid the inconvenience of the extra weight. Moreover, in order to avoid the necessity of carrying all types of cleaning equipment and materials during a cleaning operation, again to avoid excessive weight, the housewife will frequently use a less efficient cleaning device or material simply to avoid the necessity of going after or trying to locate the proper device or material.

Accordingly, a primary object of this invention is the provision of a cleaning equipment cart supported upon a pair of wheels and constructed so that it can be easily handled, even by a child, and which is capable of supporting practically any type of cleaning equipment or material normally used for cleaning homes or small commercial buildings and which can be readily moved up and down stairways.

A further object of this invention is the provision of a cleaning equipment cart, as aforesaid, having a substantially horizontal platform upon which an inverted stool can be securely mounted, the stool being constructed so that its supporting legs and braces define with the lower part of the cart a walled zone in which a container, such as a bucket, or waste-paper basket can be positioned and supported. Also, the horizontal platform can be used to support a vacuum sweeper or the like.

A further object of this invention is the provision of a cart, as aforesaid, wherein all of the wheels and the equipment and material supported thereby are substantially completely disposed between two planes defined by the main, side frame members of the cart.

Other objects and purposes of this invention will become apparent to persons familiar with the problems encountered in cleaning homes or small commercial buildings when reading the following descriptive material and examining the accompanying drawings, in which:

FIGURE 1 is a perspective view of a cleaning equipment cart embodying the invention.

FIGURE 2 is an enlarged, partially exploded and sectional view taken along the line II—II in FIGURE 1.

FIGURE 3 is a sectional view taken along the line III—III in FIGURE 2.

Figure 5:
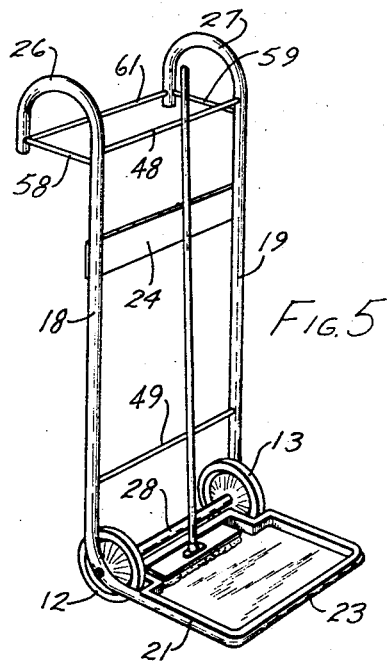
FIGURE 5 is a perspective view similar to that appearing in FIGURE 1 with parts of the equipment and support therefor removed from the cart.
Figure 4:
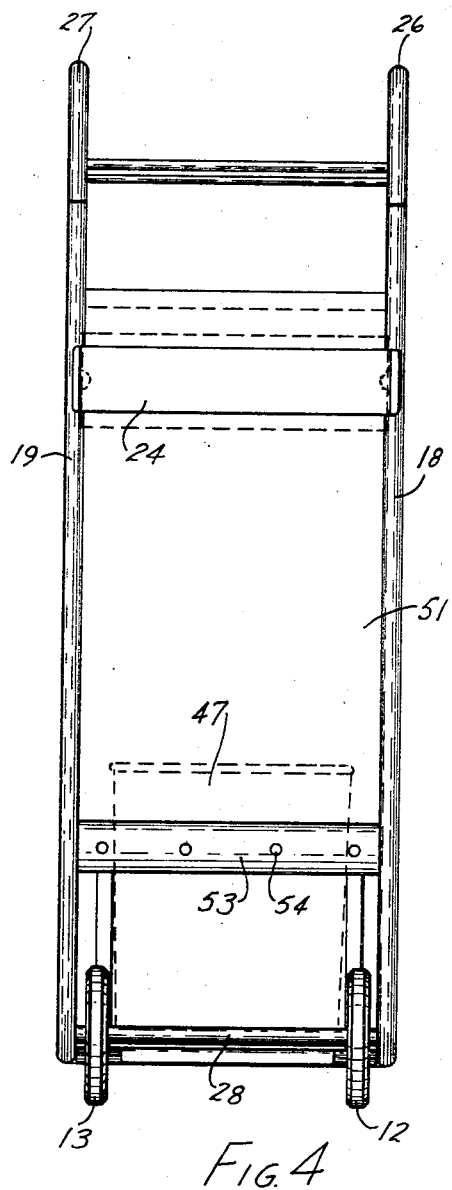
FIGURE 4 is a rear elevational view of said cleaning equipment cart with some of the parts thereof removed.
Figure 6:
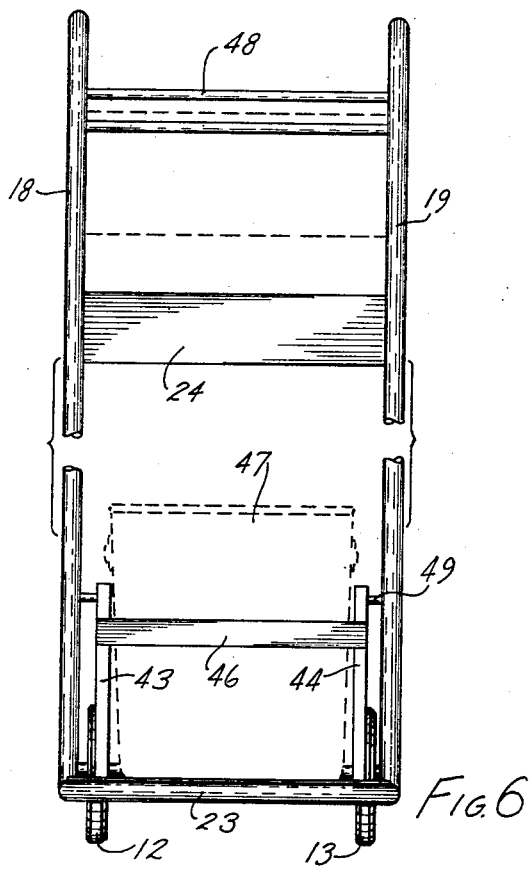
FIGURE 6 is a broken, front elevational view of said cart with some of said parts thereof removed.

For convenience in description, the terms "front," "rear," "upper," "lower" and words of similar import will have reference to the cart and parts thereof as appearing in FIGURE 6 which illustrates the front side thereof. The terms "inner," "outer" and derivatives thereof will have reference to the geometric center of said cart and parts thereof.

SUMMARY OF THE INVENTION

The objects and purposes of the invention, including those set forth above, have been met by providing a two-wheeled cart having a substantially L-shaped frame defining a lower, substantially horizontal platform below which the wheels extend. The frame has an upright portion upon which most of the cleaning equipment and materials are supported and handles at the upper end of the frame. Normally, the cart is maintained in an "at rest" position wherein it is supported upon the two wheels, which are adjacent the lower end of the upright portion, and the frontward edge of the platform. A footstool is removably supported in an inverted position upon the platform so that its leg and brace structure cooperate with the lower end of the cart to provide a support which partially surrounds the wall of the container.

DETAILED DESCRIPTION

The two-wheeled cart 10 for storing and transporting cleaning equipment (FIGURE 1) is comprised of an L-shaped frame 11 supported upon a pair of wheels 12 and 13. The frame 11 comprises a pair of spaced, substantially L-shaped side members 16 and 17 having upright legs 18 and 19 and horizontal legs 21 and 22, respectively. The L-shaped side members 16 and 17 define a pair of spaced parallel planes. The upright legs 18 and 19 include a pair of integral, curved handles 26 and 27 on the upper ends thereof to facilitate movement of the cart. The side members 16 and 17 are interconnected by a lower cross member 23 integral with the front ends of the horizontal legs 21 and 22. Thus, the L-shaped side members 16 and 17 and the lower cross member 23 may be constructed by appropriately bending a single piece of lightweight, tubular stock. A crossbar 24, which may be comprised of strap material, is secured, as by welding, to the upright legs 18 and 19 at a point spaced upwardly from the lower ends thereof.

An axle 28 is mounted at its opposite ends upon the L-shaped side members 16 and 17 at the intersection of upright legs 18 and 19 with horizontal legs 21 and 22. The wheels 12 and 13 are rotatably mounted, as by conventional bearing means, upon the axle 28 between and adjacent the side members 16 and 17, respectively, and extend below the horizontal legs 21 and 22. The wheels 12 and 13 preferably have rubber tread 31 and 32, but they may be molded of a plastic.

The cart 10 also includes a horizontal platform or deck 33 which may be pressed from metal or molded from any suitable plactic material. Said deck has a flanged sidewall or edge portion 34 which overlies and is supported by the horizontal legs 21 and 22 and the lower cross member 23. Thus, the deck 33 has a recessed support surface 36 including a larger rectangular portion 37 adjoining a smaller rectangular portion 38.

The stepstool 41 has a seat member 42 and a pair of legs 43 and 44. A brace member 46 is attached to and extends between said legs 43 and 44. The stool 41 may be inverted and placed upon the horizontal deck 33 with the seat member 42 resting snugly and securely but removably within the larger recessed portion 37. A scrub pail, shown in broken lines at 47 in FIGURE 2, may be supported upon the bottom side of seat member 42 and is held in place between the legs 43 and 44, the brace 46 and the part of the cart structure described hereinafter. Alternatively, the pail 47 may be supported directly upon the deck 33.

The cart 10 has a pair of spaced crossrods 48 and 49 extending between and secured to the upright legs 18 and 19 of the L-shaped members 16 and 17 for the support of an equipment storage panel 51. The panel 51 may be constructed of any suitable sheet material, such as sheet plastic or cloth and has an upper fold 52 mounted on rod 48 and a lower fold 53 connected to the rod 49. The folds 52 and 53 may be closed by rivets or releasable snap fasteners 54. The panel 51 has a plurality of pockets, here four larger pockets 56 and three smaller pockets 57, for storage of various cleaning tools and materials, such as brushes, cloths and containers of cleaning solutions or powders.

The cart 10 also includes rods 58, 59 and 61, which are secured to and extend between parts of the handles 26, 27 and the upright legs 18, 19. A rectangular and upwardly opening container 62, which may be constructed of plastic or metal, has a plurality of tabs 63 extending sidewardly therefrom to support the container on the rods 58, 59 and 61. The container 62 may be used for the storage of small cleaning materails or those which have greater incidence of usage, such as dustcloths.

A bracket 66, which has spaced flanges 67 and 68, may be mounted upon the upper cross member 24 to support a roll 69 of paper towels or cleaning tissue.

Although a particular preferred embodiment of the invention has been disclosed above for illustrative purposes, it will be understood that obvious or variations or modifications which lie within the scope of the invention, are fully contemplated.

The embodiments of the invention in which an exclusive property or privilege is claimed are defined as follows:

1. A cart for carrying cleaning equipment, comprising:
    frame means including a pair of spaced, L-shaped frame members defining substantially parallel planes, said frame members having upright and horizontal legs and means rigidly interconnecting said legs;
    axle means connected to and extending between the lower ends of said upright legs substantially at the intersection thereof with said horizontal legs;
    wheel means mounted on said axle means and extending substantially below the plane defined by said horizontal legs, said wheel means being disposed between said pair of L-shaped frame members;
    deck means supported on said horizontal legs and having a substantially horizontal support surface extending between said horizontal legs, said deck means also including upstanding edge means fixedly connected to and projecting upwardly from said horizontal support surface and extending along the front and opposite sides of said deck means, said edge means being secured to and supported by said horizontal legs;
    stool means having a seat member adapted to be positioned on said deck means and closely retained within said upstanding edge means;
    handle means on the upper ends of said upright legs; and
    equipment support means mounted upon said upright legs.

2. A cart according to claim 1, wherein said stool means has leg means and brace means defining with said equipment support means a walled zone, and a bucket-like container positioned within said walled zone and at least partially supported upon the underside of the seat member of said stool means.

3. A cart according to claim 1, wherein said interconnecting means includes first crossbar means between said horizontal legs remote from said wheel means and second crossbar means between said upright legs spaced from said wheel means; and
    wherein said frame members, said first crossbar means and said handle means comprise portions of a single, elongated, tubular element.

4. A cart according to claim 1, wherein said handle means includes substantially semicircular, curved handles fixedly secured to the upper end of said upright legs, said handles being positioned substantially within said parallel planes and opening in a downward direction;
    an elongated tray-shaped container extending between said handles with said container being positioned within the space defined by said downwardly opening curved handles; and
    rod means for mounting said tray-shaped container on said handles.

5. A cart according to claim 1, wherein said axle means includes an axle shaft extending between said upright legs;
    said wheel means including a pair of laterally spaced wheel members supported on said axle shaft with each of said wheel members being positioned on the inner side of and closely adjacent to a respective one of said upright legs; and
    said horizontal support surface of said deck means including an elongated portion positioned in front of said pair of wheel members and extending transversely between said horizontal legs, said elongated portion having a transverse length greater than the spacing between said pair of wheel members.

6. A cart according to claim 5, wherein said elongated portion of said support surface is substantially rectangular; and
    said horizontal support surface including a further substantially rectangular portion fixedly secured to said elongated portion along the rear edge thereof, said further portion being of shorter transverse length than said elongated portion and extending into the region between said pair of spaced wheel members.

References Cited

UNITED STATES PATENTS

| | | | |
|---|---|---|---|
| 1,432,037 | 10/1922 | Russell | 280—47.19 |
| 1,942,562 | 1/1934 | Meyers | 280—47.19 |
| 2,131,673 | 9/1938 | Robinson | 280—47.19 |
| 2,488,425 | 11/1949 | Marrone. | |
| 2,570,504 | 10/1951 | Van House | 280—47.19 |
| 2,596,749 | 5/1952 | Webber | 280—47.35 X |
| 2,636,207 | 4/1953 | Reece | 280—47.19 X |
| 2,778,654 | 1/1957 | Gottlieb | 280—47.19 X |
| 2,893,749 | 7/1959 | Simonsen | 280—47.19 |

LEO FRIAGLIA, Primary Examiner

JOHN A. PEKAR, Assistant Examiner

U.S. Cl. X.R.

211—60; 248—129